United States Patent
Barkley et al.

[11] 3,782,806
[45] Jan. 1, 1974

[54] BISTABLE OPTICAL SWITCH UTILIZING LEAD PHOSPHATE OR LEAD STRONTIUM PHOSPHATE CRYSTALS

[75] Inventors: John R. Barkley, Wilmington, Del.; Lothar H. Brixner, West Chester, Pa.

[73] Assignee: E. I. du Pont de Nemours and Company, Wilmington, Del.

[22] Filed: Oct. 27, 1972

[21] Appl. No.: 301,539

[52] U.S. Cl............ 350/149, 340/173 R, 350/150, 350/161, 350/162 SF
[51] Int. Cl. ............................................. G02f 1/24
[58] Field of Search........................... 350/149, 150; 340/173 R, 173.2; 252/62.9

[56] References Cited
UNITED STATES PATENTS
3,701,585  10/1972  Barkley et al........................ 350/150
3,704,937  12/1972  Waring ........................... 350/150 X
3,732,549  5/1973  Barkley............................. 340/173.2

*Primary Examiner*—John K. Corbin
*Attorney*—D. R. J. Boyd

[57] ABSTRACT

Lead phosphate and certain mixed phosphates of lead and strontium are pure ferroelastic materials which can be switched from one strain state to another by mechanical stress. The crystals are transparent to visible radiation and the strain states are biaxially birefringent, the optic axes of adjacent domains separated by a domain wall lying in different spatial directions. Accordingly, if a suitable polarizer and analyzer is employed to extinguish light passing through one strain state, the strain state to which it can be switched will transmit light. Thus is there provided mechanically actuated optical switch. The optical properties of the domain wall likewise differ from either adjacent domain and in conjunction with spatial filtering (and/or optionally polarization filtering) can be used to provide mechanically actuated line scanners.

14 Claims, 5 Drawing Figures

PATENTED JAN 1 1974 3,782,806

BISTABLE OPTICAL SWITCH UTILIZING LEAD PHOSPHATE OR LEAD STRONTIUM PHOSPHATE CRYSTALS

FIELD OF THE INVENTION

This invention relates to optical devices using the properties of a transparent pure ferroelastic crystal.

THE PRIOR ART

Crystals having coupled ferroelectric/ferroelastic properties have been employed to construct optical switches, line scanners and the like heretofore. In particular gadolinium molybdate has been employed for this purpose.

The existence of ferroelasticity was first clearly recognized by Aizu, J. Phys. Soc., Japan, 27, 298 (1969). According to Aizu a crystal is said to be ferroelastic when it has two or more orientation states in the absence of mechanical stress and can be switched from one orientation state to another by mechanical stress. The states are identical or enantiomorphous in crystal structure and different in mechanical strain tensor at null mechanical stress. A plot of stress versus strain for such materials exhibits a hysteresis loop similar to that of ferromagnetic materials. Also like ferromagnetic materials, ferroelastic materials usually exhibit a Curie temperature above which the ferroelastic properties are absent and a new paraelastic phase of different crystal structure is present.

Ferroelastic materials are divided into domains throughout which the strain tensor is the same. Two domains which differ in the strain tensor interface at one of two possible mutually perpendicular walls which are highly planar in contrast to ferromagnetic domain walls. Switching is generally accomplished by motion of the domain walls in a direction perpendicular to the wall over a wide range of stress, the rate of switching increasing linearly with applied stress provided a certain threshold value is exceeded. The velocity of the domain walls is limited. If excess force is applied switching can occur by nucleation and motion of additional domain walls. The new domain walls are generally initiated in pairs originating from one edge of the crystal as a thin blade-like structure called a dagger domain which ultimately extends completely across the crystal to form two domain walls. The new domain walls then move in opposite directions under the applied stress.

Aizu further recognized coupled ferroelastic/ferroelectric materials wherein ferroelastic domains coextensive with the ferroelectric domains exist and which have the same Curie temperature for the ferroelectric and ferroelastic properties. Such crystals can be switched by the application of either electrical or mechanical stress.

The existence of ferroelectricity and/or ferroelasticity can be deduced by the crystal point symmetry of a material above and below the transition temperature. Aizu has given a classification of all possible point group symmetry combinations that lead to ferroelectric and/or ferroelastic properties.

Gadolinium molybdate was described as a coupled ferroelectric/ferroelastic crystal in Aizu's original paper. A suitable crystal cut perpendicular or nearly so to the c axis can be switched by the application of an electric field between electrodes deposited on the faces thereof. Such crystals have been employed heretofore to construct a variety of optical devices based on the differing optical properties of the domain and the region of the domain wall.

The domains of gadolinium molybdate are biaxially birefringent. On crossing a domain wall the a and b axes of the low temperature orthorhombic ferroelectric/ferroelastic gadolinium molybdate structures are interchanged. Accordingly the direction of rotation of polarized light is reversed. If circularly polarized light is incident on a λ/4 retardation plate of gadolinium molybdate containing a domain wall, the E vectors of the light emerging from the plate on either side of the wall lie in mutually perpendicular planes, aligned with or at 90° to the domain wall. Thus an analyzer set to extinguish light from one domain will transmit that from the other. By switching the crystal, i.e., by moving the domain wall across the optical aperture, there is provided an optical switch. Similar switches have been described in U. S. Pat. 3,559,185.

The optical properties of the domain wall differ from either adjacent domain in that (1) light transmitted by the domain wall region does not have its plane of polarization altered as in the bulk crystal and (2) incident collimated light undergoes divergence, i.e., the domain wall appears to act as a "source." Accordingly, by use of spatial and/or polarization filtering of light transmitted by a suitable plate of a coupled ferroelectric/ferroelastic material, line scanners can be constructed which provide either a line of light over a dark field or vice versa as disclosed in copending commonly assigned patent applications Ser. No. 119,237 and Ser. No. 119,238, now U.S. Pat. Nos. 3,701,585 and 3,704,937, respectively.

The above devices operate largely by virtue of the ferroelastic properties of the crystal which restrain the switching to the lateral motion of highly planar domain walls. Heretofore the devices of the art have employed coupled ferroelectric/ferroelastic crystals such as gadolinium molybdate which have the necessary optical properties. Such devices are not without disadvantages, since electrodes are required which detract from the desirable optical properties. Heretofore, no suitable pure ferroelastic materials have been known which exhibit suitable optical properties.

In our laboratories we have recognized that α-lead phosphate is a pure ferroelastic material and have devised ways to utilize this material in a number of optical devices based on ferroelastic switching. In addition, we have discovered novel isotypic lead strontium phosphate crystals which can likewise be employed in optical applications.

SUMMARY OF THE INVENTION

The apparatus of the present invention is an optical device comprising a substantially b-c cut ferroelastic single crystal plate of a composition having the formula $Pb_{3-x}Sr_x(PO_4)_2$ wherein x is 0 to 0.8, divided into a first ferroelastic domain region and a second ferroelastic domain region by a domain wall region. Means are supplied to apply a mechanical stress to the plate, so that the wall can be moved controllably across the plate. A light beam is passed through the plate and means are provided to distinguish the light passing through one of the regions of the plate from the light exiting the plate.

In this invention the light passing through one domain can be distinguished from the remainder of the light passing through the plate, that is the light passing the selected domain can be attenuated with respect to the remainder of the exiting light or vice versa using polarization filtering. There is thus provided an optical switch. Likewise, the light passing the region of the domain wall can be distinguished from the light passing through both adjacent domains, that is, the light passing through both domains can be attenuated with respect to the light passing the region of the domain wall or vice versa. This can be accomplished by polarization filtering or spatial filtering. There is thus provided an optical line scanner.

THE DRAWINGS AND DETAILED DESCRIPTION OF THE INVENTION

The present invention is directed to optical devices which utilize the optical properties of ferroelastic lead phosphate and lead phosphate wherein part of the lead is substituted by strontium. All of the materials are isomorphous and have the crystal symmetry 2/m in the ferroelastic state.

For simplicity the discussion hereafter will be limited to lead phosphate, but the same considerations apply to the compositions wherein part of the lead is replaced by strontium except that the spectral range of the strontium-substituted composition is somewhat greater, and the Curie temperatures is decreased, depending on the strontium content.

This invention will be better understood by reference to the drawings which accompany this specification. In the drawings:

FIGS. 1a–b show a b-c cut plate of lead phosphate which is divided into two domains by a domain wall;

Ferroelastic α-lead phosphate has monoclinic symmetry, space group 2/m below the Curie temperature of 179°C. Above the Curie temperature the paraelastic phase has symmetry $\bar{3}m$ and thus is classified as $\bar{3}mF2/m$ in the Aizu notation, and is a pure ferroelastic, i.e., possesses ferroelastic but not ferroelectric properties.

The crystal structure of the high temperature (paraelastic form) and the low temperature (ferroelastic) for of $Pb_3(PO_4)_2$ has been determined by Keppler: Z. fuer Kristall. 132, 228–235 (1970) who found $c = 20.30 \pm 0.05$ A. and $a = 5.53 \pm 0.02$ A. for the high temperature phase at $200° \pm 15°C$ and $a = 13.816 \pm 0.035$ A, $b = 5.692 \pm 0.015$ A, $c = 9.429 \pm 0.024$ A. and $\beta = 102.36° \pm 0.05°$. The a axis of the trigonal form corresonds to the b axis of the monoclinic form and the plane perpendicular to the c axis of the trigonal form corresponds to the b-c plane of the monoclinic form.

The possible ferroelastic domains can be deduced by group theory following the method applied by Shuvalov: J. Phys. Soc. Japan 28, Supplement 38 (1970) for ferroelectric domains.

On cooling through Tc, a strain spontaneously occurs in one of the three equivalent mirror planes of the high temperature trigonal structure, resulting in one of the three possible orientations for the monoclinic axis of the low temperature form. Throughout a ferroelastic domain the monoclinic axis has the same orientation. Each pair of domains differ in strain orientation, i.e., the monoclinic axes have two different orientations. They can interface without lattice mismatch only at the two planes that bisect the strain axes interfaced. Since each of three different domain pairs can interface with two different walls, a total of six wall orientations are possible.

α-Lead phosphate transmits electromagnetic radiation between $5\mu$ and $0.28\mu$, i.e., including the visible range of the spectrum. The refractive index of the ferroelastic material is about $2.1 \pm 0.05$ at 5500 A. and the material is biaxially birefringent with $\Delta n \approx 7 \times 10^{-5}$ (optically negative) for propagation of light along the pseudotrigonal c-axis. The optic axes lie in the a-c mirror plane of the monoclinic unit cell. The high temperature form is uniaxially birefringent and isotropic along the c axis.

The crystals cleave readily along the b-c plane to form plates which are suitable for use in the present invention when suitably selected or treated as described hereinafter to obtain a state having a single domain wall.

With respect to a b-c plate the six possible domain walls can be classified into three n-walls and three t-walls.

n-Walls are essentially perpendicular to the b-c plane and lie at 60° to the a-c mirror plane of the monoclinic unit cell and hence to the optic plane.

The three t-walls lie at 30° to the a-c mirror plane of the monoclinic unit cell and at an angle of about 73° to the b-c plane.

Figure 1A:
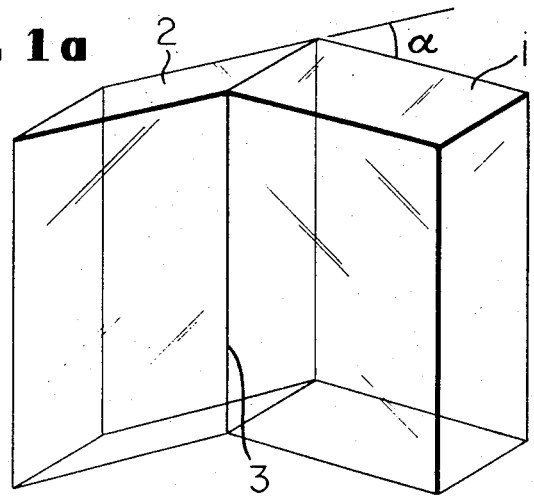
Figure 1B:
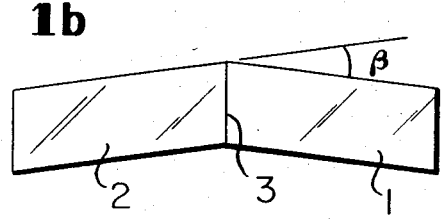

Referring to FIG. 1a and 1b there is shown the plane view and an edge view of a b-c cut plate of α-lead phosphate divided into two domains, 1, 2 by a domain wall, 3. The spontaneous strain is manifested by a "bend" in the crystal at the domain wall given by the angle α in FIG. 1a and the angle β in FIG. 1b. The following values have been obtained by direct the angles α and β.

|        | α°   | β°   |
|--------|------|------|
| n-wall | 4.4° | 1.6° |
| t-wall | 4.6° | 0°   |

Application of shear stress across and parallel to the wall causes the wall to move sideways through the crystal. It is important that the shear stress be applied parallel to the wall direction since this avoids switching or partial switching of the crystal by the nucleation and propagation of domain walls, having undesired orientation.

Optically, an α-lead phosphate crystal such as that shown in FIG. 1a can be divided into three regions, domain 1, domain 2 and a narrow region in the vicinity of the domain wall. Domains 1 and 2 are birefringent, but the optic plane is rotated about 120° in passing across the domain wall if the wall is of the n-type and 60° if the wall is a t-type, the optic planes are symmetrically oriented about the wall. The optical properties in the region of the domain wall differ from either of the adjacent domains. The domain wall appears to encompass a finite region, of the order of a micron in width, and affects light passing along the domain wall differently from light passing through regions adjacent to the wall. This wall region probably represents a continuous change in properties in passing from one domain to the adjacent domain rather than a region over which the properties are abruptly different. The wall also acts as a light diffracting or deflecting step object in contrast to the domains, which are transparent, thus light passing the region of the domain wall can be isolated from light passing through either adjacent domains by polarization filtering and/or spatial filtering.

In the case of light transmitted by a b-c cut plate of α-lead phosphate, the t-type wall region can be considered as a region having a width which increases with the increasing thickness of the crystal, i.e., line scanners can be constructed wherein the width of the line can be varied.

Ferroelastic crystals having two domains separated by a domain wall with different strain states can be switched by applying any stress tending to elongate or compress one of the domains along its strain axis. In order to avoid nucleation of unwanted domains, it is essential that the stress applied does not have a component directed along the strain axis of other possible states which exceeds the threshold stress required for nucleation. A preferred method of achieving this is to apply a shear stress across the desired domain wall and parallel thereto.

Figure 2:
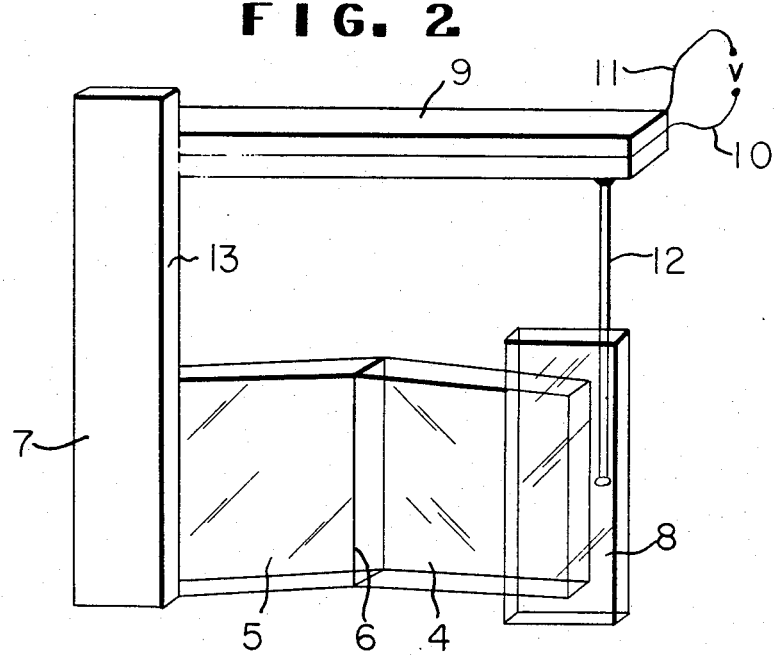
FIG. 2 shows apparatus for clamping a crystal such as that of FIG. 1 to prevent the nucleation of domain walls in unwanted directions, and for applying stress to the crystal to move the domain wall.

FIG. 2 illustrates a method of clamping the crystal and of applying mechanical stress to drive the domain wall (which can be either an n-type or a t-type wall) back and forth in a fixed region. In FIG. 2, the crystal of α-lead phosphate consisting of domains 4 and 5 separated by a domain wall 6 is cemented to a fixed clamp 7 which acts as a support for the entire assembly. The clamp 7 is constructed of a rigid material such as glass and has a straight edge 13 which is aligned parallel to the domain wall 6 and should be cemented to the crystal with a liquid hardenable cement which does not exhibit shrinkage on hardening thus imposing strain on the α-lead phosphate crystal. Such strain tends to induce the formation of domain walls of unwanted orientation. The clamp is contacted with the crystal and carefully aligned, then the liquid cement is allowed to flow between the clamp and the crystal by capillary attraction to obtain a smooth straight cement line following the edge of the clamp and then hardened. An α-cyanoacrylate cement is suitable for this purpose.

A second, smaller clamp 8 is cemented in the same manner on the opposite edge to that clamped by the clamp 7, which is free to move relative to clamp 7. The unclamped region of the crystal between clamps 7 and 8 can be called the switching region. Wall 6 can move in the switching region between the clamped regions of the plate, however, the clamps prevent physical distortion of the plate to which they are cemented and thus prevent movement of domain wall 6 into the prohibited regions of the α-lead phosphate plate which they cover. The presence of clamps 7 and 8 further acts to prevent the formation of domain walls of undesired orientation from originating in the clamped regions. Clamp 8 can be moved relative to clamp 7 by mechanical means. In FIG. 2 there is shown a bender bimorph 9 constructed of two piezoelectric ceramic strips which are oriented, electroded and joined together. Such devices are well known as mechanical-electrical transducers, e.g., in ceramic phonograph cartridges. On application of a voltage V across the leads 10 and 11 attached to the electrodes of the bender bimorph, the element bends. Generally a voltage of 100–200 volts is sufficient to drive the device which is capable of audio frequency response. The end of the bender bimorph 9 opposite the clamp 7 is attached to a drive rod 12 which in turn is connected to the clamp 8 and α-lead phosphate crystal with cement and aligned parallel with the domain wall. On application of a voltage to the bender bimorph a shear stress is applied to the crystal plate directed across and parallel to the domain wall. The wall is thereby moved across the ferroelastic crystal plate in a direction determined by the polarity of the applied voltage.

A crystal of α-lead phosphate provided with means to drive the domain wall in response to control signals can be employed to construct optical switches and line scanners with an appropriate source of light and polarization filtering.

Figure 3:
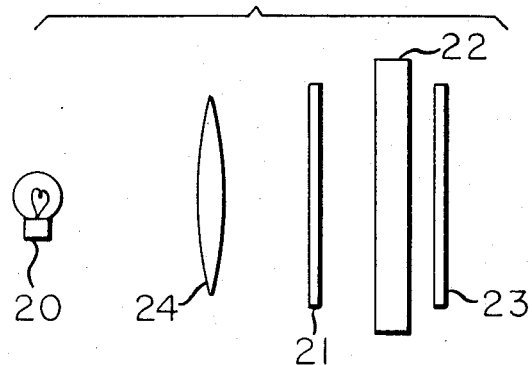
FIG. 3 illustrates a method of making an optical switch or a line scanner using the apparatus of FIG. 2 with polarization filtering.

FIG. 3 shows apparatus which can be employed to construct either an optical switch or an optical line scanner. A light source such as an electric lamp 20 is provided with a collimating lens 24 to collimate the light to an essentially parallel beam. A polarizer 21 such as a sheet of Polaroid is provided in the path of the collimated beam which thereafter traverses an α-lead phosphate crystal 22 such as that of FIG. 2 provided with means to drive the domain wall. The emerging light passes through an analyzer 23.

In order to construct an optical switch, the polarizer 21 is oriented so that the light incident on one selected domain has its E vector aligned with the optic plane, i.e., at 60° from the domain wall for an n-type wall or at 30° for the domain wall for a t-type wall. The analyzer 23 is crossed with the polarizer 21 so that light traversing the selected domain is extinguished. The other domain, interfacing with the selected domain at the domain wall transmits light. Accordingly as the domain wall is driven back and forth across the switching region formed between clamps 7 and 8 the device blocks or transmits light according to whether or not the selected domain fills the aperture of the device.

The boundary between the light-obscuring portion of the aperture covered by the selected domain of the α-lead phosphate and the light transmitting portion is highly linear and when an n-type wall is employed, extremely sharp. With a t-type wall, the transition between light and dark is less well defined the width depending on the thickness of the crystal. The domain wall in either case is observed as the interface between the dark and light domains under these conditions.

By generating an image of crystal 22 the arrangement of FIG. 3 can also be employed to produce a line corresponding to the region of the domain wall traversed by the light, which can be either dark on a light field or light on a dark field.

To generate an image of an n-type wall the polarizer 21 is oriented so that the E vector of the light is parallel to the domain wall 25 of the α-lead phosphate crystal 22. For a light line on a dark field the analyzer 23 is oriented so that it is parallel with the polarizer 21. Light traversing the domains is then substantially attenuated compared with light passing through the region of the domain wall.

If a dark line image is desired the polarizer 21 should be set so that the E vector of the incident light is perpendicular to the domain wall and the analyzer 23 should be set so that it is perpendicular with the analyzer. Light passing through the region of the domain wall will be extinguished while some light will pass the adjacent domains.

If a $t$-type wall is employed the polarizer 21 should be set so that the E vector of the incident light is perpendicular to the domain wall and the analyzer 23 is parallel therewith to obtain a light line image on a dark field.

In each case, optimum results are obtained when polarizer and analyzer are set symmetrically with respect to the domain wall, i.e., either parallel or perpendicular thereto as the case may be. However it will be realized that small departures from the ideal settings will not substantially affect the results.

Since the optic plane for the domains is symmetrically disposed at 60° from the domain wall in the case of an $n$-type cell, and 30° from the domain wall in case of a $t$-type wall, polarization filtering, as described hereinabove, does not give high contrast. A preferred technique is to employ spatial filtering, utilizing the property of the domain wall of acting as an apparent source of light when the crystal is illuminated (preferably with collimated light).

Figure 4:
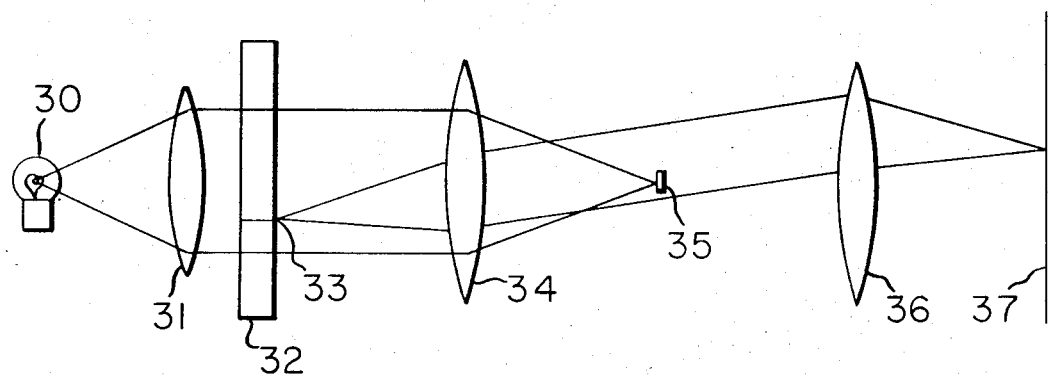
FIG. 4 illustrates a method of making a line scanner utilizing the apparatus of FIG. 2 with spatial filtering of the transmitted light.

FIG. 4 shows apparatus that can be used to obtain a line scanner by spatial filtering. A light source such as an electric lamp 30 is collimated to a parallel beam by lens 31 and passes through $\alpha$-lead phosphate plate 32 which is divided into two domains by a domain wall 33. The light passing the domains is brought to a focus by lens 34 placed at about its focal length from the plate 32. A small stop 35 placed at the focus of lens 34 traps the light passing the domains. The domain wall, as discussed supra, operates as a source, the light diverging therefrom, with an aperture of about $f$ 20 and is collimated by lens 34. Thus apart from a small loss which depends on the area of the stop, the light passing the domain wall region passes the stop and can be focused by lens 36 onto screen 37 as a light line image on a dark field. If the stop 35 is replaced by a pinhole aperture the light traversing the region of the domain wall is stopped but light traversing the domain is transmitted. Accordingly a dark line image of the domain wall region is obtained on screen 37. more elaborate spatial filters can be employed to improve contrast.

In all of the above applications it is necessary to employ crystal plates of $\alpha$-lead phosphate or the isotypic lead strontium phosphates wherein the plate is divided into two domains by a domain wall of either the $n$- or the $t$-type. As noted previously there are six possible domain wall orientations in a single crystal of lead phosphate and the crystal is readily switched by stress. In most samples of single crystals a complex pattern of domain walls is found which prevents switching the crystal to the desired state by simple stress. Accordingly in order to obtain useful specimens it is usually necessary to "pole" the crystal plates, that is to change them to a form where all or substantially all of the domain walls present are oriented in a single direction. Such a poled crystal plate can then be converted to the desired condition in which it contains only a single wall by the application of suitable stress.

One method of poling the crystals of lead phosphate is described in copending commonly assigned patent application Ser. No. 301,540 filed Oct. 27, 1970. The method uses a hot stage having a uniform temperature gradient preferably not more than 10°C/cm. and having the isotherm at the Curie temperature near the center of the stage. The crystal plate is placed in the cool end of the stage then manipulated so that only a region containing domain walls of selected orientation remains below the Curie temperature, the domain walls running at a substantial angle, greater than 45°, to the Curie point isotherm. The crystal is then cooled either by reducing current to the hot stage or by moving the crystal so that the Curie point isotherm sweeps through the crystal in a direction perpendicular to its length. The desired domain walls extend behind the Curie point isotherm crystal. Subsequently they may be removed by application of stress to pole the crystal.

Another method of poling a ferroelastic crystal is to apply stress directed along a selected domain wall direction while cooling the crystal through the Curie temperature. A relatively small stress is tried at first, and the process repeated with increased stress, if needed.

We claim:

1. An optical device comprising
   a substantially $b$-$c$ cut ferroelastic single crystal plate of a composition having the formula

   $$Pb_{3-x}Sr_x(PO_4)_2$$

wherein $x$ is 0 to 0.8;
   said plate being divided into a first ferroelastic domain region and a second ferroelastic domain region by a domain wall region;
   means to apply a mechanical stress to said plate whereby the ferroelastic plate is switched from said first domain to said second domain over a substantial portion of said plate;
   means to pass a beam of light through said plate, and
   means to distinguish the light passing through one region of said plate from the light exiting said plate.

2. Device of claim 1 wherein said stress is a shear stress across said domain wall and parallel to said domain wall.

3. Optical device of claim 2 wherein said means to distinguish light passing through one region of said plate comprises:
   a polarizer disposed in said beam prior to said beam passing through the crystal, and
   an analyzer disposed in said beam after said beam passes through the crystal.

4. Optical device of claim 3 wherein said polarizer and said analyzer are set to extinguish light passing through said first domain.

5. Optical device of claim 3 wherein said polarizer and analyzer are oriented symmetrically with respect to said domain wall whereby the light passing the region of the domain wall is distinguished from light passing said first domain and said second domain.

6. Optical device of claim 5 wherein said domain wall is an $n$-domain wall.

7. Optical device of claim 5 wherein said domain wall is a $t$-domain wall.

8. Optical device of claim 2 wherein said means to distinguish light passing through one region of said plate comprises
   lens means in the path of said bean after exiting said crystal whereby light passing said first domain region and said second domain region is brought to a focus at a focal plane while light passing the domain wall region is unfocused at said focal plane;
   a stop at said first focal plane to distinguish light passing said first domain region and light passing said second domain region from light passing said domain wall region, and means to focus the light passing said stop.

9. Optical device of claim 8 wherein said stop includes a small opaque stop at said first focus whereby the light from the region of the domain wall selectively passes said focal plane, and is imaged at said second focus.

10. Optical device of claim 9 wherein said wall is an $n$-wall.

11. Optical device of claim 9 wherein said wall is a $t$-wall.

12. Optical device of claim 8 wherein said stop is a pinhole aperture, whereby the light passing said first domain and said second domain selectively passes said focal plane and is imaged at said second focus.

13. Optical device of claim 12 wherein said wall is an $n$-wall.

14. Optical device of claim 12 wherein said wall is a $t$-wall.

* * * * *